United States Patent Office 3,565,859
Patented Feb. 23, 1971

3,565,859
DIORGANOPOLYSILOXANE COMPOSITIONS
CURABLE ON EXPOSURE TO MOISTURE
Raymond Calas, Le Bouscat, and Parasko Nicou, Lyon, France, assignors to Rhone-Poulenc S.A., Paris, France, a French body corporate
No Drawing. Filed Sept. 9, 1968, Ser. No. 758,576
Claims priority, application France, Sept. 15, 1967, 121,197
Int. Cl. C08f 11/04
U.S. Cl. 260—46.5         7 Claims

ABSTRACT OF THE DISCLOSURE

Tetrasubstituted ethylenedioxysilanes (cyclic orthosilicates) when mixed with α,ω-dihydroxy-diorganopolysiloxanes give compositions which vulcanise on exposure to moisture.

---

The present invention relates to organosilicon compositions which can be vulcanised into elastomers at ambient temperature by the action of water in the liquid or vapour state.

Numerous systems for the transformation of liquid organopolysiloxanes into rubbery solids have already been proposed. Thus, in French Pat. No. 1,179,969, it has been proposed to mix, at the moment of use, certain difunctional diorganopolysiloxane compounds with a crosslinking agent of the formula: $R_mSiX_{(4-m)}$ (in which R represents an alkyl or aryl group, X a functional group such as hydroxy, alkoxy or amino, and $m$ a number smaller than 2) and a condensation catalyst.

It has also been proposed to provide compositions which can be kept in the liquid or pasty state until the moment they are used and which are only transformed into a rubber-like solid by exposure to a humid atmosphere. These compositions are generally formed by an association of an α,ω-dihydroxy-organopolysiloxane, a crosslinking agent and generally one or more fillers. Among the various crosslinking agents used at present, the organotriacyloxysilanes (see French Pat. No. 1,198,749) the aminosilanes or aminosilazanes (see German Pat. No. 1,120,690), and the aldiminoxy-silanes and ketiminoxysilanes (see French Pat. Nos. 1,432,799 and 1,314,649) are examples. The organotriacyloxysilanes and the aminosilanes have the disadvantage of liberating substances of acid or basic character at the time of vulcanisation; and the compositions based on aldiminoxysilanes or ketiminoxysilanes only vulcanise rather slowly.

The present invention provides new organosilicon compositions which can be vulcanised into elastomers at ambient temperature, under the action of water in the liquid or vapour state, without using catalysts. During vulcanisation, which is fairly rapid, no acid or alkaline products are liberated. The new compositions are moreover stable during storage in the absence of humidity.

The compositions of the invention comprise a mixture of:

(a) an α,ω-dihydroxy-diorganopolysiloxane oil; and
(b) a cyclic orthosilicate of the formula:

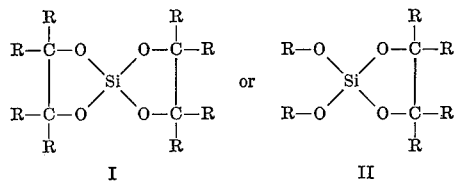

I   or   II in which the symbols R represent unsubstituted or substituted, identical or different hydrocarbon radicals, and two radicals R carried either by a single carbon atom or by two adjacent carbon atoms may be optionally linked together to form a divalent hydrocarbon radical. When two radicals R, carried either by a single carbon atom or by two adjacent carbon atoms, are linked, these possibilities may be illustrated by the following diagrams:

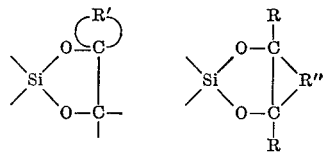

The radicals represented by R may contain atoms or groups which do not interfere with the vulcanisation or the storage stability of the compositions.

Examples of radicals which may be represented by R are lower alkyl radicals, such as methyl, ethyl, isopropyl, t-butyl; lower alkenyl radicals such as vinyl or allyl; cycloalkyl radicals, optionally substituted by lower alkyl, such as cyclopentyl, cyclohexyl, or methylcyclohexyl; aryl radicals derived from benzene, such as phenyl, or lower alkyl-substituted phenyl, e.g., methylphenyl; and aralkyl radicals such as phenyl (lower alkyl), e.g. benzyl or phenylethyl. Two radicals R, carried either by a single carbon atom or by two adjacent carbon atoms, may be linked together to form alkylene making up a 5- or 6-membered ring, which is unsubstituted or substituted by lower alkyl. By "lower" is meant containing up to 4 carbon atoms.

Examples of orthosilicic esters which can be used in the invention are: bis-(tetramethylethylenedioxy)-silane, bis-(1,2 - dimethyl - 1,2 - diethyl-ethylenedioxy)-silane, bis-(tetracyclohexylethylenedioxy) - silane, bis-(tetraphenylethylenedioxy)-silane, bis-(1,1' - dicyclopentylenedioxy)-silane, 1,1' - dicyclopentylenedioxy-tetramethylethylenedioxysilane, bis-(1,2 - dimethyl-1,2-cyclopentylene-dioxy)-silane, tetramethylethylenedioxy - diethoxysilane, 1,2-dimethyl-1,2-diethylethylenedioxy-dimethoxysilane.

The α,ω-dihydroxylated diorganopolysiloxane oils which can be used in the new compositions may be represented by the formula:

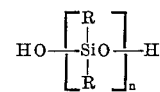

in which the symbols R are as defined above and $n$ represents an integer from 20 to 2500, preferably from 100 to 1500. These oils can be homopolymers or copolymers, that is to say, they can be formed by identical or different units of formula:

In addition, it is also possible to employ mixtures of oils of different molecular weights.

The proportion of orthosilicate ester (b) relative to the α,ω-dihydroxy-diorganopolysiloxane oil (a) varies according to the nature of the ester, the oil, and the characteristics desired for the resulting elastomer. In general, quantities from 0.05 to 10 molecules, preferably from 0.25 to 5 molecules, per OH group of the diorganopolysiloxane oil are suitable.

When the cyclic orthosilicate (b) is liquid, it can be added alone or associated with a diluent. When this ester is solid, it is preferable to mix it in solution or in the molten state with the diorganopolysiloxane, so as to distribute it in a homogeneous manner. Solvents and diluents suitable for this purpose are aliphatic, cycloaliphatic, and aromatic hydrocarbons, which may or may not be halogenated ethers, esters and alcohols.

The compositions can also contain (c) a filler, pigment, diluent or adjuvant. Especially suitable fillers are the so-called reinforcing fillers, such as silicas of combustion (fume silicas) and the silica aerogels with a large surface, treated with an organosilicic derivative, such as octamethyl-cyclotetrasiloxane. It is also possible to employ fillers such as crushed crude silicas, crushed quartz, aluminium oxide, titanium dioxide, iron oxide, zinc oxide, calcium carbonate, graphite, carbon black, polyvinyl chloride, or cork powder. The proportion of filler relative to the $\alpha,\omega$-dihydroxydiorganopolysiloxane oil varies according to the nature of the filler and the physical characteristics required of the elastomer.

When the composition is too viscous, it is possible to add to it a diluent, preferably a halogenated or non-halogenated aliphatic and cycloaliphatic hydrocarbon, such as hexane, heptane, isooctane, cyclohexane, methyl-cyclohexane, chloroform, 1,2-dichloroethane, or trichloroethylene, a halogenated or non-halogenated aromatic hydrocarbon, such as benzene, toluene or chlorobenzene, an ether such as propyl or butyl ether, an ester such as methyl or ethyl acetate, or an alcohol such as methanol, ethanol, isopropanol or t-butanol. It is also possible to dilute the mixture with diorganopolysiloxane oils which do not contain hydroxyl groups or with cyclic diorganopolysiloxanes such as octamethyl-cyclotetrasiloxane.

Although their presence is not essential for conventional uses, it is possible to add to the new compositions a small quantity of accelerator when it is desired to obtain a very high vulcanisation speed. Suitable substances for this purpose are organic and mineral acids, such as hydrochloric acid or acetic acid.

The new composiitons are easily obtained by mixing the $\alpha,\omega$-dihydroxy-diorganopolysiloxane oil with the orthosilicate ester and optionally a filler, pigment, diluent or adjuvant, at ambient temperature or with gentle heating. When these compositions are intended for immediate use, the mixture can be prepared without any particular precautions, and even without completely excluding water. However, to prepare compositions which are storage stable for several months, anhydrous materials must be used and the mixing effected under anhydrous conditions. With small proportions of orthosilicate, even when operating in the complete absence of water, a limited increase in viscosity of the mixture is sometimes observed, but once this viscosity is stabilised, it does not increase any more while the composition is shielded from the action of water. For the formation of compositions intended for a different use, it may thus be necessary to adjust the proportion of orthosilicate and/or to use a diluent in order finally to have a composition with a viscosity level compatible with its use. In practice, for these compositions, it may be preferable to use at least 1 molecule of cyclic orthosilicate per hydroxyl group of the $\alpha,\omega$-hydroxy-diorganopolysiloxane oil.

When it is desired to obtain compositions containing fillers which are stable during storage, it is preferable first of all to mix the oil and the fillers, carefully to dry the mixture by heating under a stream of inert gas and then, after cooling to ambient temperature, to add the cyclic orthosilicate as defined above. It is also preferable, particularly for compositions intended to undergo a prolonged storage, to heat the anhydrous mixture thus prepared to a temperature of up to 120° C. for several minutes.

It will be understood that the definition of the compositions of the invention previously given does not necessarily relate to the final form in which the ingredients are found in the mixture. The orthosilicate can in fact react to a greater or lesser degree with the dihydroxy-diorganopolysiloxane, so as to form molecules for example of the formula:

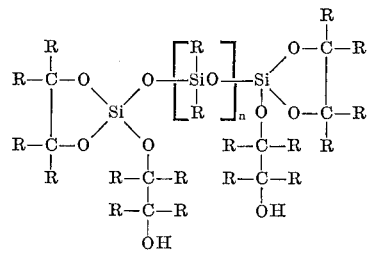

or other even more complex molecules.

In the presence of water, for example, quite simply under the action of a humid atmosphere, the compositions of the invention vulcanise to give elastic solids and the vulcanisation is the more rapid when, for a given weight, the composition has a large surface of contact with the humid medium. Vulcanisation occurs at ambient temperature, that is to say at 15 to 25° C., but is more rapid as the temperature is raised. The rate of vulcanisation also depends on the nature of the radicals R (or R' and R"), on the molecular weight of the diorganopolysiloxane oil used, and on the nature of any solvent employed to dissolve the cyclic orthosilicate.

The new compositions can be used in all applications involving coating, covering, sealing and sticking or for the preparation of composite articles, joints and other elastic products. They are of particular interest in the coating of metal elements for electrical uses or in dental mixtures, because at the time of vulcanisation they only liberate glycols, i.e. neutral substances which in practice are free from corrosive properties on metals or natural teeth.

The cyclic orthosilicates of Formula I used in the compositions can be prepared by the reaction of an $\alpha$-glycol of formula:

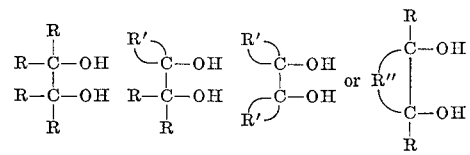

with silicon tetrachloride, in the presence of a tertiary base to bind the hydrogen chloride liberated, as described in French Patent No. 1,108,242. It is also possible to operate by reacting an alkyl orthosilicate, such as ethyl orthosilicate, with one of the $\alpha$-glycols described above, at the rate of at least two molecules of $\alpha$-glycol to one molecule of alkyl orthosilicate, while eliminating the more volatile alkanol liberated by the transesterification as it is formed. This operation can be conducted in the presence of sodium as catalyst, according to the method of Helferich et al. (Ber. 80 163 (1947)).

This latter process also makes it possible easily to obtain mixed cyclic orthosilicates, such as 1,1'-dicyclopentylenedioxytetramethylethylenedioxysilane. In fact, it is possible first of all to cause the reaction of only one molecule of $\alpha$-glycol with one molecule of alkyl orthosilicate, to effect a partial transesterification, and then to complete the reaction by adding one molecule of another $\alpha$-glycol.

To prepare the cyclic orthosilicates of Formula II, the simplest method consists in reacting one molecule of one of the aforementioned $\alpha$-glycols with one molecule of an orthosilicic ester of formula $Si(OR)_4$, while carrying out the transesterification in the manner described above, that is to say, by eliminating the hydroxylated derivative ROH as it is formed and operating in the presence of sodium as catalyst.

The cyclic orthosilicates thus prepared can be isolated by distillation and purified by recrystallisation or rectification at atmospheric pressure or under reduced pressure.

The following examples illustrate the invention. In these examples, the Shore A hardness is measured by the ASTM standard D 676–49 T, the tearing resistance by ASTM standard D 624–49 T, specimen A. The resistance and the elongation at break are measured by means of dumb-bell test elements $H_3$, as described in the French Standard AFNOR T 46 002.

EXAMPLE 1

Into a mixer with a capacity of 250 cc. are introduced 100 g. of α,ω-dihydroxy-dimethylpolysiloxane oil having a viscosity at 25° C. equal to 17,700 cp. and a hydroxyl group content of 0.07%. The oil is heated to 180° C. for 2 hours under a stream of nitrogen to eliminate all trace of water, cooled to 60° C., and a 2.1 g. of bis-(tetramethylethylenedioxy)-silane are added. The mixture is kept for 2 hours at this latter temperature with stirring and in an anhydrous atmosphere.

The cooled composition is spread out as a layer 2 mm. thick on a glass sheet previously coated with an aqueous solution of the sodium salt of a secondary alcohol sulphate known commercially under the trademark "Teepol." After exposure to ambient air for 15 minutes, the specimen is no longer tacky on the surface and, after 2 hours, a transparent elastic film may be detached from the support.

EXAMPLE 2

Into a mixer with a capacity of 2 litres are introduced 1000 g. of α,ω-dihydroxy-dimethylpolysiloxane oil, similar to that of Example 1, 50 g. of silica of combustion provided with an organosilicic coating by treatment with octamethylcyclotetrasiloxane, 250 g. of diatomaceous silica, and 100 g. of octamethylcyclotetrasiloxane. The mixture is stirred and kept under a stream of nitrogen, while it is heated to 180° C. and kept at this temperature for 2 hours. In this way, 86 g. of octamethylcyclotetrasiloxane are eliminated.

After cooling, 6 fractions, each of 131 g. are taken, to which are respectively added the following compounds:

Fractions 1 and 2: 2.1 g. of bis-((tetramethylethylenedioxy)-silane, dissolved in 4 cc. of ethanol.
Fraction 3: 2.5 g. of bis-(1,2-dimethyl-1,2-diethylethylenedioxy)-silane, dissolved in 2 cc. of ethanol.
Fraction 4: 2.9 g. of bis-(1,1'-dicyclopentylenedioxy)-silane, dissolved in 8 cc. of ethanol.
Fraction 5: 1.9 g. of tetramethylethylenedioxy-diethoxysilane.
Fraction 6: By way of comparison, 1.7 g. of ethyl-orthosilicate are incorporated.

Each fraction is then heated at 60° C. for 2 hours. All these operations take place in the absence of water (liquid or vapour).

Fraction 1 is kept protected from humid air and the other 5 fractions are spread out on a glass sheet, as described in Example 1. The different speeds of vulcanisation recorded are set out in the following table:

| Number of fraction: | Surface hardening time | Time necessary for detachment of the film |
|---|---|---|
| 2 | 5 minutes | 1 hour, 45 min. |
| 3 |  | 5 days. |
| 4 | 10 minutes | 3 hours. |
| 5 | do | 1 hour, 15 min. |
| 6 | After exposure for 3 days, the surface is just as tacky as at the start. | |

After one week, the films obtained from the fractions 2, 3, 4 and 5 have the following mechanical properties:

| Elastomer obtained from the fraction No. | Shore A hardness | Breaking resistance, kg./cm.² | Elongation at break, percent | Tearing resistance, kg./cm. |
|---|---|---|---|---|
| 2 | 40 | 28 | 290 | 8.7 |
| 3 | 45 | 9 | 530 | 6.6 |
| 4 | 40 | 19 | 420 | 6.5 |
| 5 | 40 | 25 | 380 | 6.9 |

Fraction 1 is perfectly preserved after being stored for 1½ months under anhydrous conditions. After this period, exposure of the composition to air leads to an elastomer, of which the mechanical properties are identical with those of the film obtained from fraction 2.

The vulcanising agents used in fractions 3, 4 and 5 are obtained in the following manner:

(a) Preparation of bis - (1,2-dimethyl-1,2-diethylethylenedioxy)-silane.—Into a 500 cc. spherical flask equipped with a distillation system and containing a nitrogen atmosphere 162.6 g. (1.12 molecules) of 2,3-diethyl-2,3-dihydroxybutane, 116.5 g. (0.56 molecule) of ethyl ortrosilicate and 0.1 g. of sodium are introduced. The mixture is heated progressively to 200–210° C., while the ethanol formed during the reaction is distilled off. The mixture is then cooled and, by rectification under a reduced pressure of 0.3 mm. Hg, 81.5 g. of bis-(1,2-dimethyl-1,2-diethylethylenedioxy)-silane are obtained, B.P. 120–125° C./0.3 mm. Hg, having the following physical constants: $n_D^{20}=1.4595$, $d_4^{20}=1.013$.

(b) Preparation of bis - (1,1'-dicyclopentylenedioxy)-silane.—Into a 250 cc. spherical flask, equipped with a distillation system and containing a nitrogen atmosphere, 34 g. (0.2 molecule) of 1,1'-dihydroxydicyclopentyl and 20.8 g. (0.1 molecule) of ethyl orthosilicate are introduced. The flask is heated to 120° C., to make the mixture homogeneous and then 0.1 g. of sodium is added. The temperature is brought progressively to 170° C., and this temperature is maintained for 8½ hours, while the ethanol formed is distilled off. The reaction product is then distilled and 30.5 g. of bis-(1,1'-dicyclopentylenedioxy)-silane, B.P. 160–170° C., 0.5 mm. Hg, are collected. The melting point of this ester is 142° C.

(c) Preparation of the tetramethyl-ethylenedioxy-diethoxysilane.—Into a 250 cc. spherical flask, equipped with a distillation system and containing a nitrogen atmosphere, are introduced 104 g. (0.5 molecule) of ethyl orthosilicate, 59 g. (0.5 molecule) of pinacol and 0.2 g. of sodium. The mixture is heated to 160° C., for 4 hours, whilet he ethanol formed is distilled off. By distillation of the resulting mixture at 18 mm. Hg, 26.5 g. of tetramethylethylenedioxy-diethoxysilane are obtained between 110 and 120° C., having the following physical characteristics: $n_D^{20}=1.4142$, $d_4^{20}=0.966$.

EXAMPLE 3

Two fractions, each of 131 g. are taken from a filled mixture obtained as in Example 2. The first fraction (Fraction a) has 2.1 g. of bis-(tetramethylethylenedioxy)-silane dissolved in 4 cc. of ethanol incorporated therein, and the second fraction (Fraction b) has 2.1 g. of bis-(tetramethylethylenedioxy)-silane dissolved in 4 cc. of diethyl ether incorporated therein. Each fraction is homogenised by stirring for 15 minutes at ambient temperature (25° C.) in the absence of moisture.

Each fraction is then spread out on a glass sheet and exposed to the humidity of the air, as described in Example 1. The vulcanisation speeds and the mechanical properties of the films obtained are set out in the following tables:

| | Surface hardening time, minutes | Time necessary for detachment of the film, hours |
|---|---|---|
| Fraction (a) | 30 | 4 |
| Fraction (b) | 5 | 3 |

| | Shore A hardness | Breaking resistance, kg./cm.² | Elongation at break, percent | Tearing resistance, kg./cm. |
|---|---|---|---|---|
| Fraction (a) | 40 | 20 | 320 | 6.8 |
| Fraction (b) | 40 | 23 | 310 | 6.9 |

EXAMPLE 4

100 g. of an α,ω-dihydroxy-organopolysiloxane oil containing, by weight, 85 g. of dimethylsiloxy units to 15 g. of methylvinylsiloxy units, having a viscosity at 25° C., of 58 centipoises and containing 0.058% by weight of OH groups, are mixed with 5 g. of silica of combustion, 25 g. of diatomaceous silica, and 40 cc. of octamethylcyclotetrasiloxane. The homogeneous mixture is heated for 2 hours at 180° C., under a nitrogen atmosphere and 32 cc. of octamethylcyclotetrasiloxane are simultaneously distilled off. The mixture is cooled to 60° C., 1.8 g. of bis-(tetramethylethylenedioxy)-silane dissolved in 4 cc. of ethanol are added, and this temperature is maintained for 2 hours.

A film is formed as described in Example 1. Surface hardening occurs after exposure for 5 minutes to the ambient air. This film can be detached from its support after 2 hours. After one week, the elastomer has the following properties:

Shore A hardness: 46
Breaking strength: 20 kg./cm.²
Elongation on break: 300%
Tearing resistance: 9 kg./cm.

EXAMPLE 5

The procedure of Example 4 is used, using 100 g. of an α,ω-dihydroxy-organopolysiloxane oil, containing 85 g. of dimethylsiloxy units to 15 g. of diphenylsiloxy units, having a viscosity of 42,000 centipoises at 25° C., and containing 0.06% by weight of OH groups, and 2 g. of bis-(tetramethylethylenedioxy)-silane.

A film produced as in Example 1, dries on the surface after exposure to ambient air for 8 minutes and can be detached after 2 hours. This film has the following mechanical properties:

Shore A hardness: 48
Breaking strength: 15 kg./cm.²
Elongation at break: 380%
Tearing resistance: 7.5 kg./cm.

EXAMPLE 6

The operation is carried out as in Example 4 with 1.1 g. of bis-(tetramethylethylenedioxy)-silane dissolved in 2 cc. of ethanol and an α,ω-dihydroxy-dimethylpolysiloxane oil with a viscosity of 100,000 centipoises at 25° C. containing 0.033% by weight of OH groups.

The film obtained is dry on the surface in 2 minutes and can be detached from its support after 1½ hours. The mechanical characteristics of this film are as follows:

Breaking resistance: 23.5 kg./cm.²
Elongation on break: 380%
Tearing resistance: 7.5 kg./cm.

EXAMPLE 7

Two fractions each of 131 g. are prepared as in Example 2, and 2.5 g. of bis(1,2-dimethyl-1,2-divinylethylenedioxy)-silane dissolved in 4 cc. of ethanol (Fraction A) and 5.7 g. of bis-(1,2-dimethyl-1,2-diphenylethylenedioxy)-silane dissolved in 8 cc. of ethanol (Fraction B) are added thereto respectively.

The films obtained from these two fractions have the following mechanical properties:

| | Fraction A | Fraction B |
|---|---|---|
| Breaking resistance, kg./cm.² | 27 | 24 |
| Elongation on break, percent | 360 | 410 |
| Tearing resistance, kg./cm. | 7.7 | 10 |

We claim:
1. An organosilicon composition vulcanisable at ambient temperature by the action of water in the liquid or vapour state comprising a mixture of:
  (a) an α,ω-dihydroxy-diorganopolysiloxane oil of the formula:

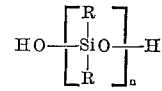

and
  (b) a cyclic orthosilicate of the formula:

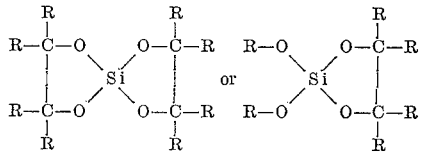

in which $n$ is an integer from 20 to 2500 and the symbols R each represent lower alkyl, lower alkenyl, cycloalkyl, lower alkyl-cycloalkyl, phenyl, lower alkyl-phenyl or phenyl(lower alkyl), and in the case of the said orthosilicates only, two radicals R carried either by a single carbon atom or by two adjacent carbon atoms may be linked together to form alkylene making up a 5- or 6-membered ring which is unsubstituted or substituted by lower alkyl.

2. A composition according to claim 1 in which the symbols R represent lower alkyl, lower alkenyl, cyclopentyl, cyclohexyl, lower alkyl-substituted cyclopentyl or cyclohexyl, phenyl, lower alkyl-substituted phenyl, phenyl(lower alkyl), or two radicals R carried either by a single carbon atom or by two adjacent carbon atoms may be linked together to form alkylene making up a 5- or 6-membered ring which is unsubstituted or substituted by lower alkyl.

3. A composition according to claim 1, in which the cyclic orthosilicate (b) is bis-(tetramethylethylenedioxy)-silane, bis-(1,2-dimethyl-1,2-diethyl-ethylenedioxy)-silane, bis-(1,1'-dicyclopentylenedioxy)-silane, or tetramethylethylenedioxy-diethoxy-silane.

4. A composition according to claim 1 containing 0.25 to 5 molecules of the orthosilicate (b) per hydroxyl group in the diorganopolysiloxane oil (a).

5. An organosilicon elastomer produced by exposing to moisture a composition as defined in claim 1.

6. Process for the preparation of a composition vulcanisable at ambient temperature by the action of water in the liquid or vapour state comprising a mixture of:
  (a) an α,ω-dihydroxy-diorganopolysiloxane oil

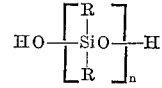

and
  (b) a cyclic orthosilicate of the formula:

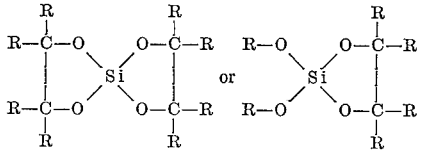

in which $n$ is an integer from 20 to 2500 and the symbols R each represent lower alkyl, lower alkenyl, cycloalkyl, lower alkyl-cycloalkyl, phenyl, lower alkyl-phenyl or phenyl (lower alkyl), and in the case of the said orthosilicates only, two radicals R carried either by a single carbon atom or by two adjacent carbon atoms may be linked together to form alkylene making up a 5- or 6-membered ring which is unsubstituted or substituted by lower alkyl, which comprises mixing the specified dihydroxydiorganopolysiloxane (a) and orthosilicate ester (b).

7. Process according to claim 6 wherein the said components are mixed under conditions which exclude the presence of water, the mixture obtained is heated for a few minutes to a temperature of up to 120° C., and a storage stable composition is obtained.

References Cited

UNITED STATES PATENTS

| | | | |
|---|---|---|---|
| 3,065,194 | 11/1962 | Nitzsche et al. | 260—37 |
| 3,328,340 | 6/1967 | Vaughn, Jr. | 260—37 |

FOREIGN PATENTS

| | | | |
|---|---|---|---|
| 867,485 | 5/1961 | Great Britain | 260—37 |
| 1,027,051 | 4/1966 | Great Britain | 260—46.5 |

HOSEA E. TAYLOR, Primary Examiner

M. I. MARQUIS, Assistant Examiner

U.S. Cl. X.R.

260—37, 827